Jan. 10, 1933.  J. E. BODA  1,893,641
DISK HARROW
Filed Oct. 9, 1931   2 Sheets-Sheet 1
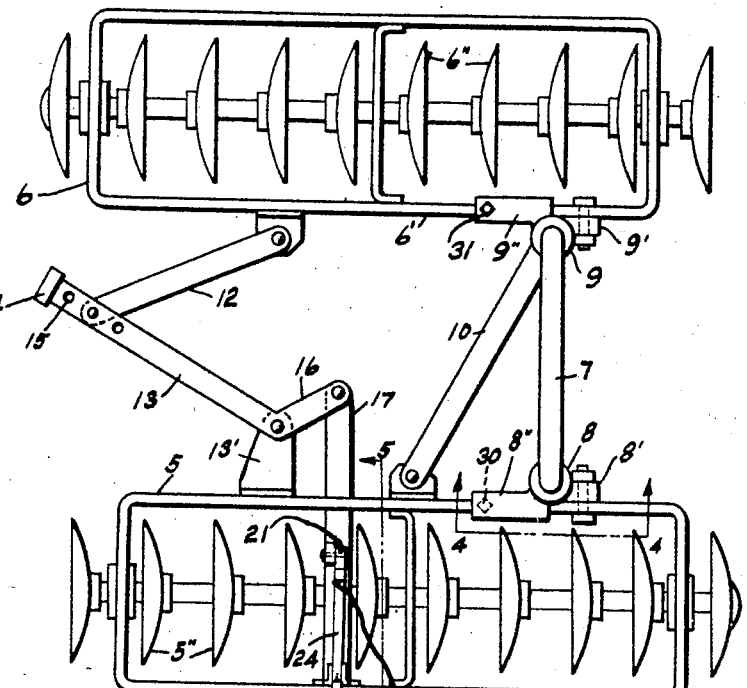
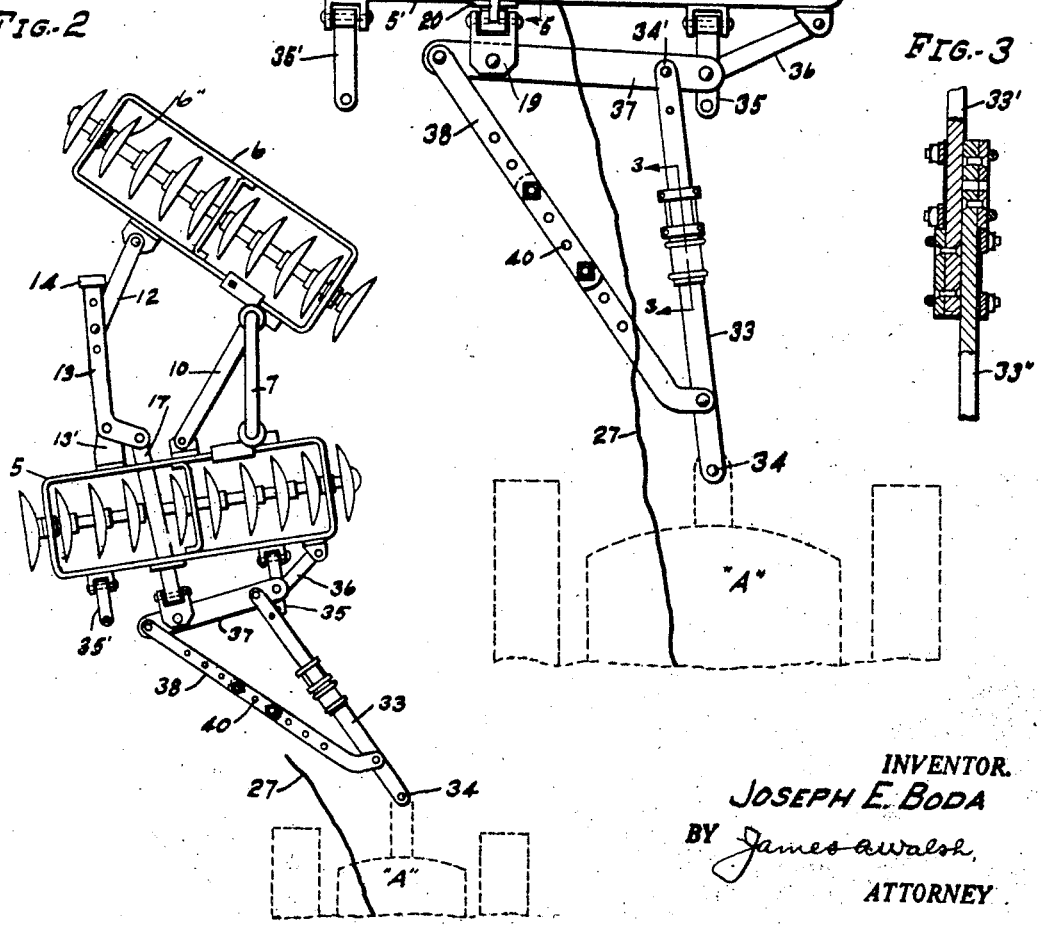
INVENTOR.
JOSEPH E. BODA
BY James A. Walsh
ATTORNEY Jan. 10, 1933.  J. E. BODA  1,893,641
DISK HARROW
Filed Oct. 9, 1931   2 Sheets-Sheet 2

INVENTOR.
JOSEPH E. BODA
BY James a Walsh
ATTORNEY

Patented Jan. 10, 1933

1,893,641

UNITED STATES PATENT OFFICE

JOSEPH E. BODA, OF ROCKFORD, ILLINOIS, ASSIGNOR TO J. I. CASE COMPANY, OF RACINE, WISCONSIN, A CORPORATION

DISK HARROW

Application filed October 9, 1931. Serial No. 567,863.

My invention relates to improvements in disk harrows and the like whereby the gangs may be readily adjusted for transport position and also for field working condition, through the power transmitted by a drawbar connecting the harrow and a tractor, and which implement is especially adapted for use in orchards for cultivating between trees or vines in vineyards, and the like, the connections between the gangs and between the forward gang and the tractor being arranged so as to maintain the harrow in offset relation to the tractor to operate under trees and the tractor to avoid the limbs and foliage thereof. Provision is also made so that the gangs will become automatically adjusted to suitable position when turning right-hand corners and then to automatically resume normal cultivating position, and other improvements are included for providing flexibility and adjustments between the gangs and other parts and to in general better the construction and operation of an implement of substantially the character stated, as will now more fully appear.

Figure 4:
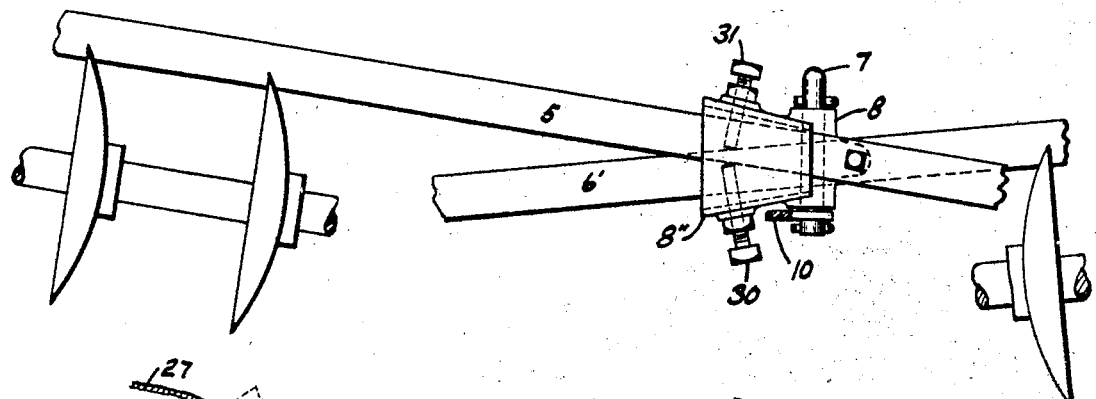
Figure 5:
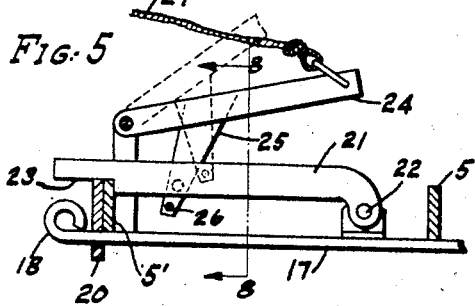
Figure 6:
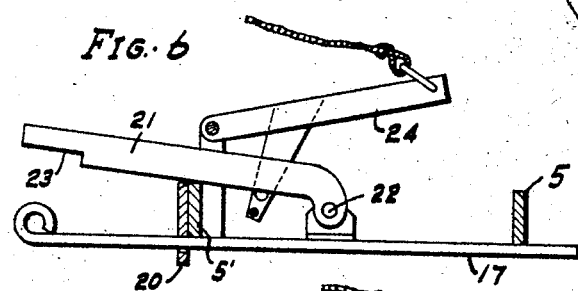
Figure 8:
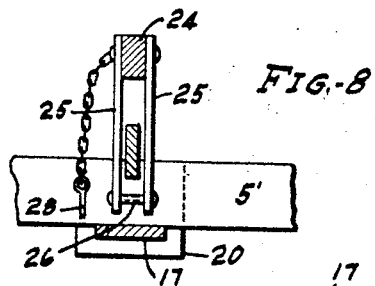
Figure 7:
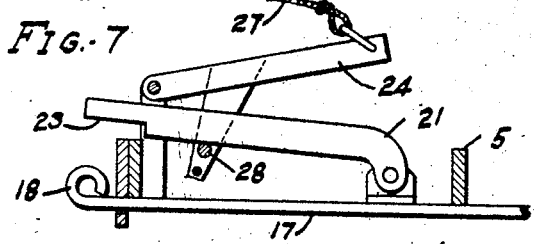
Figure 9:
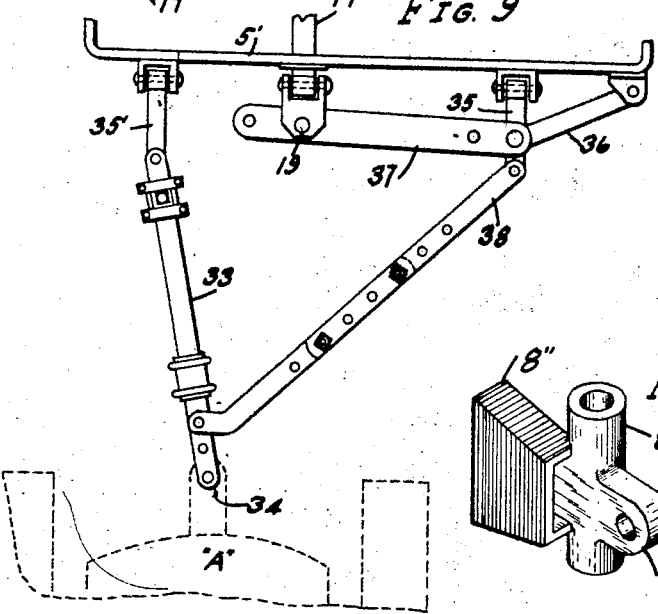
Figure 10:
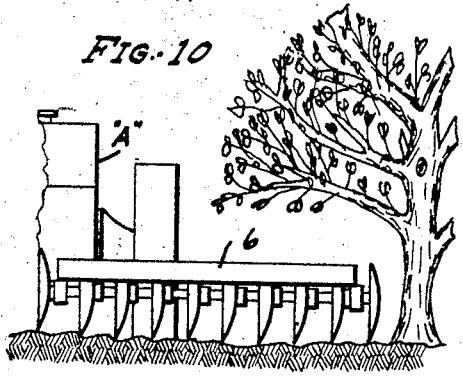

In the accompanying drawings, forming part hereof, Figure 1 is a plan of my improved harrow when in transport positions, the gangs being locked in parallel relation; Fig. 2, a plan of the harrow when in cultivating position and indicating the offset relation of the same to a tractor; Fig. 3, a detail section taken on the dotted line 3—3 in Fig. 1; Fig. 4, a detail section on the dotted line 4—4 in Fig. 1; Fig. 5, a detail section of the locking mechanism which I employ showing the latch in engagement and taken on the dotted line 5—5 in Fig. 1; Figs. 6 and 7, similar views showing the latch in varied positions; Fig. 8, a detail section on the line 8—8 in Fig. 5; Fig. 9, a plan of the tractor hitch in the reverse position to that shown in Fig. 1; Fig. 10, an illustrative view to show the relation between the tractor drawn implement and a tree; and Fig. 11 is a perspective of a frame retainer which I employ.

In said drawings the numerals 5 and 6 indicate the front and rear gangs, respectively, of a disk harrow or like implement connected by an arm 7 fixedly secured to the front gang in a socket member 8 forming part of a bracket to be further described, and pivotally connected to the rear gang by a similar socket 9, a brace 10 also connecting said gangs, which arm and brace form a flexible connection between the gangs. The rear gang is also connected to the front gang by a linkage system comprising the pivotally connected members 12 and 13, the latter having a head or stop 14 adapted to engage member 12 to limit the angular movement of the rear gang, as indicated in Fig. 2, said members embodying pin holes 15 for the insertion of a pin to regulate the range of movement of the rear gang. Link 13 is preferably pivoted to a support 13' and includes an arm 16 which in turns connects with a reciprocating bar 17 extending through the front gang 5 and having means, as 18, Fig. 5, at its forward end for the attachment of a clevis 19, the bar being slidably secured by a keeper 20. Upon said bar 17 a latch 21 is mounted, at 22, said latch having an offset end 23, Fig. 5, adapted to engage the forward side 5' of the front gang frame, and which latch may be disengaged by a lever 24 having a depending arm 25, including a cross-pin 26 through its members, adapted to lift the latch when lever 24 is pulled forward by a rope 27 within reach of the tractorman. When the bar 17 has been moved into forward position, by a pull of the drawbar to be described and through the action of the linkage system 12, 13, 16, the parts are in the relation indicated in Fig. 6. The engagement of the latch in the manner stated maintains the gangs in transport position as indicated in Fig. 1, and when said latch is disengaged said gangs automatically assume the relation indicated in Fig. 2 for cultivating. However, by holding the latch in disengagement as shown in Fig. 7 the harrow will travel and cultivate in substantially the position shown in Fig. 2 in straightaway cultivation, and assume the transport position, Fig. 1, when making turns at the end of a row, which is accomplished by inserting a suspended pin 28 through the members of arm 25 and which can be readily done by the tractorman, so that it becomes unnecessary to manipulate the lever 24 with the rope 27 in the circumstances stated.

Figure 11:
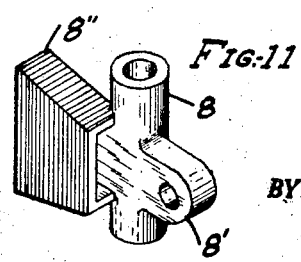

As commonly practiced, the cupped sides of the harrow disks 5″ on the front gang face in a direction oppositely to the disks 6″ of the rear gang, and consequently the disks adjacent one side of the front gang, for example, at the left in Fig. 2, and those adjacent the right-hand side of the rear gang, have a tendency to dig more deeply into the ground than the disks at the opposite sides of each gang, which is unsatisfactory and objectionable, and to obviate which the bracket 8, which includes an ear 8′ for pivotal attachment to the frame 5′, also has formed therewith a bearing or retainer 8″ adapted to support the frame member 5′, and which is of tapered formation, Figs. 4 and 11, and provided with an adjusting bolt 30. By advancing said bolt 30 the gang 5 will be adjusted upwardly so that the disks at its left side will be raised sufficiently to properly cooperate with the disks at the opposite side of said gang. The bracket 9 on the rear gang includes an ear 9′, bearing or retainer 9″ and an adjusting screw 31 assembled on the frame member 6′, which are counterparts of the similar devices on gang 5, and when said screw 31 is advanced it will urge the right-hand side of the gang 6 to raise, and thus avoid undue digging in by the rear gang disks at that side, with the result that one gang counteracts the resistance of the other, thus eliminating undue stress on the gangs, and while there is a degree of twisting strain on the bar 7 during such adjustments it will be understood that in practice it is of sufficient strength to withstand such strain.

An essential feature of my improvement is the hitch or drawbar pivotally connected to the harrow and in like manner to the reciprocating bar 17 for actuating the linkage system connecting the gangs, which power transmitting hitch comprises the telescoping main bar 33, the members 33′ and 33″, pivotally connected at 34 to a tractor A and at 34′ to a link 37 the end of which is attached to a link 35 on the gang 5, a similar link 35′ being provided at the opposite side of the gang for a purpose to appear. A short brace 36 is connected to the gang and to the link 35, the latter being further connected by the transverse link 37 to the clevis 19, and the outer end of link 37 and main bar 33 are then connected by the extensible link 38 which may be lengthened or shortened by adjustment in the holes 40 as desired to control the degree of offset of the harrow, and which parts form a triangular structure as indicated in Fig. 1. The hitch in the position shown in Fig. 1 is adapted to pull the harrow in transport position, and to offset the harrow to the right-hand side of the tractor when in cultivating condition as shown in Fig. 2, as seen when looking from the rear of the harrow toward the tractor. However, in cases where it is desirable to offset the harrow to the left-hand side of the tractor this can be readily accomplished by detaching the bar 33 at 34′ and from the tractor, and the bar 38 from the transverse link 37, which parts as a unit can then be reversed so that the bar 33 will be attached to link 35′ and bar 38 connected to link 35, as shown in Fig. 9, whereby, as stated, the harrow will be offset from the left-hand side of the tractor.

Fig. 1, as stated, indicates the gangs in locked or transport condition in relation to the tractor, the link actuating bar 17 being in the position shown in Fig. 5. However, when about to position the gangs for cultivating, the tractorman pulls the rope 27, thus releasing latch 21 from engagement with the gang frame 5′, Figs. 5 and 6, whereupon the drawbar pulls bar 17 forwardly through the front gang which through the leverage of the arm 16 and resistance of the rear gang throw the link 13 and also link 12 into the position shown in Fig. 2, thus maintaining the rear gang in angular relation to the front gang which will also be at a slight angle, the degree of angularity being limited by the stop 14, and when said gangs have assumed such position and relation the harrow will be offset to the right-hand side of the tractor and adapted to be drawn under trees as shown in Figs. 2 and 10. It will be understood also that when in such position or substantially so the harrow can be readily brought to transport position by backing the tractor to reverse the movement of bar 17 which will collapse links 12, 13, so that they will be urged toward each other, the gangs then locked, and the harrow and tractor be in the direct line as shown in Fig. 1 with the gangs in parallel relation.

I claim as my invention:

1. In a harrow including front and rear gangs, an arm fixedly secured to the front gang and pivotally connected to the rear gang, a pair of links connecting the gangs one of said links having a stop at its outer end and an arm at its inner end, a reciprocating bar connected to the arm, and means for actuating said bar to control the movement of said pair of links and the gangs.

2. In a harrow including front and rear gangs, an arm connecting said gangs, a brace link connected to said gangs, a pair of links connecting the gangs one of said links embodying a stop and an arm, a reciprocating bar connected to the arm, and means for actuating said bar to control the movement of said pair of links and the gangs.

3. In a harrow including front and rear gangs each having a socket member, means flexibly connecting said gangs including a member mounted in the socket members, a link connected to the rear gang, a link connected to the rear gang link and to the front gang, a reciprocating member connected to the front gang link, and a drawbar connected to the front gang and to said reciprocating member for actuating the latter to control the movement of said links and the gangs.

4. In a harrow including front and rear gangs each having a socket member, means flexibly connecting said gangs including a member mounted in said sockets, means connected to the gangs whereby they may be adjusted farther from and closer to each other, means mounted on the front gang and connected to the adjusting means, and a tractor operated drawbar connected to the latter means for operating the adjusting means to vary the position of said gangs.

5. In a harrow including front and rear gangs each having a socket member, means flexibly connecting said gangs including a member mounted in said sockets, means connected to the gangs whereby they may be adjusted in relation to each other, means mounted on the front gang and connected to the adjusting means for operating the latter, power transmitting means for reciprocating the operating means, means for locking the operating means to maintain the gangs in transport condition, and means for releasing the locking means whereby the harrow will assume an offset relation to a tractor for operating under trees.

6. In a harrow including front and rear gangs each having a socket member, means flexibly connecting said gangs including a member mounted in said sockets, a reciprocating bar on the front gang, a linkage system connected to the bar and to the rear gang, and means for actuating the bar to adjust the gangs farther from and closer to each other and whereby said gangs may assume an offset relation to a tractor.

7. In a harrow including front and rear gangs each having socket members, means mounted in said sockets and connected to the gangs whereby they may be adjusted in relation to each other, means for adjusting the gangs, means mounted on the front gang and connected to the adjusting means for operating the latter, a latch on the front gang for locking the operating means to maintain the gangs in transport condition, and means for disengaging the latch to release the operating means whereby the gangs will be adjusted in offset relation to a tractor.

8. In a harrow including front and rear gangs each having a socket member, means flexibly connecting said gangs including a member mounted in said sockets, reciprocating means on the front gang, extensible and retractable means connecting the reciprocating means and the rear gang, means for actuating the extensible and retractable means to adjust the gangs in relation to each other, means for engaging the reciprocating means whereby the gangs will be adjusted in transport condition, and means under control of an operator for disengaging the reciprocating means whereby the harrow will assume an offset position in relation to a tractor for operating under trees.

9. In an implement including forward and rear frames and disks supported thereby, a socket member on each of said frames, an arm mounted in said sockets and flexibly connecting the frames, a reciprocatory element on the forward frame, means flexibly connecting said element to the rear frame, and means for actuating said element comprising a transverse bar pivotally secured to the element, a telescoping main bar pivotally connected to the transverse bar, an extensible member pivotally connected to the transverse bar and to the telescoping bar, and means connecting the latter bar to a tractor whereby as the latter is traveling the implement will assume an offset position in relation thereto.

10. In an implement including forward and rear frames and disks supported thereby, a socket member on each of said frames, an arm mounted in said sockets and flexibly connecting the frames, a reciprocating element on the forward frame, means flexibly connecting said element to the rear frame, means for actuating said element comprising a transverse bar pivotally connected to the element, a telescoping element pivotally connected to the transverse bar, an extensible member connected to the transverse bar and to the telescoping bar, means for engaging and disengaging the reciprocating element in relation to the implement, and means for connecting the telescoping element to a tractor whereby when the reciprocatory element engages the implement the latter will follow a tractor in transport condition and when disengaged the implement will assume an offset relation to the tractor for passage under trees.

11. In an implement of the character described including a frame and tillage tools, a bracket on the frame embodying a socket for the reception of a connecting member and means for pivotally connecting the bracket to the frame, and means engaging the bracket and the frame for vertically adjusting the latter.

12. In a harrow including front and rear gang frames each having disks mounted thereon, a bracket pivotally mounted on the front frame including a socket and also a bearing for the frame, means adapted to engage the bearing and frame for vertically adjusting the latter, a bracket pivotally mounted on the rear frame including a socket and also a bearing for the rear frame, means adapted to engage the bearing and rear frame for vertically adjusting the latter, means engaging the sockets for pivotally connecting the front and rear frames, and extensible and retractable means connecting the frames whereby said frames may be positioned in angular relation to each other.

In testimony whereof I affix my signature.

JOSEPH E. BODA.